Nov. 26, 1935.  J. KRISTOF  2,022,242

APPARATUS FOR TURNING PLATE GLASS

Filed Feb. 11, 1935  3 Sheets-Sheet 1

Inventor
John Kristof,
By Christian R. Nielsen.
Attorney

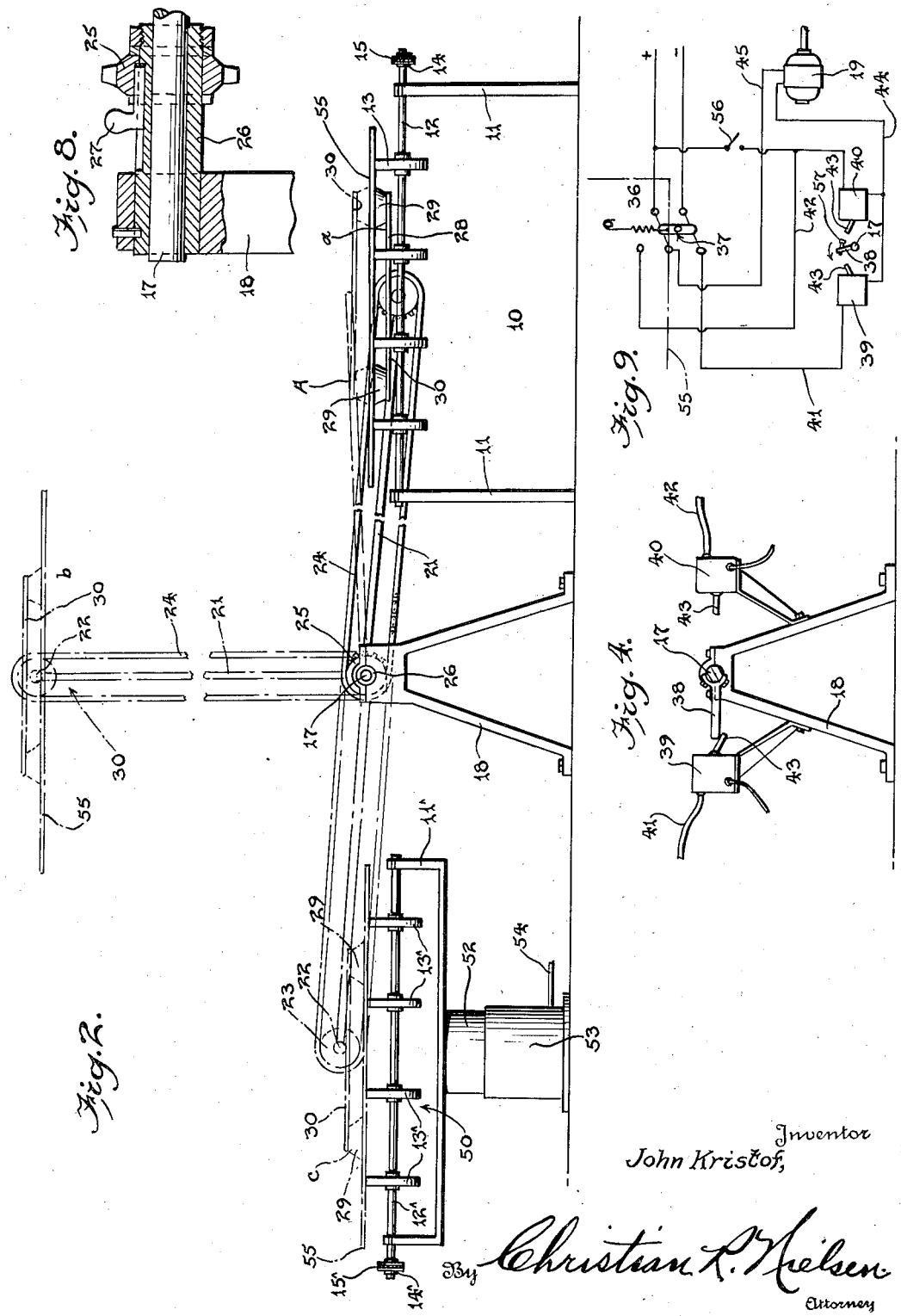

Nov. 26, 1935.  J. KRISTOF  2,022,242
APPARATUS FOR TURNING PLATE GLASS
Filed Feb. 11, 1935   3 Sheets-Sheet 3
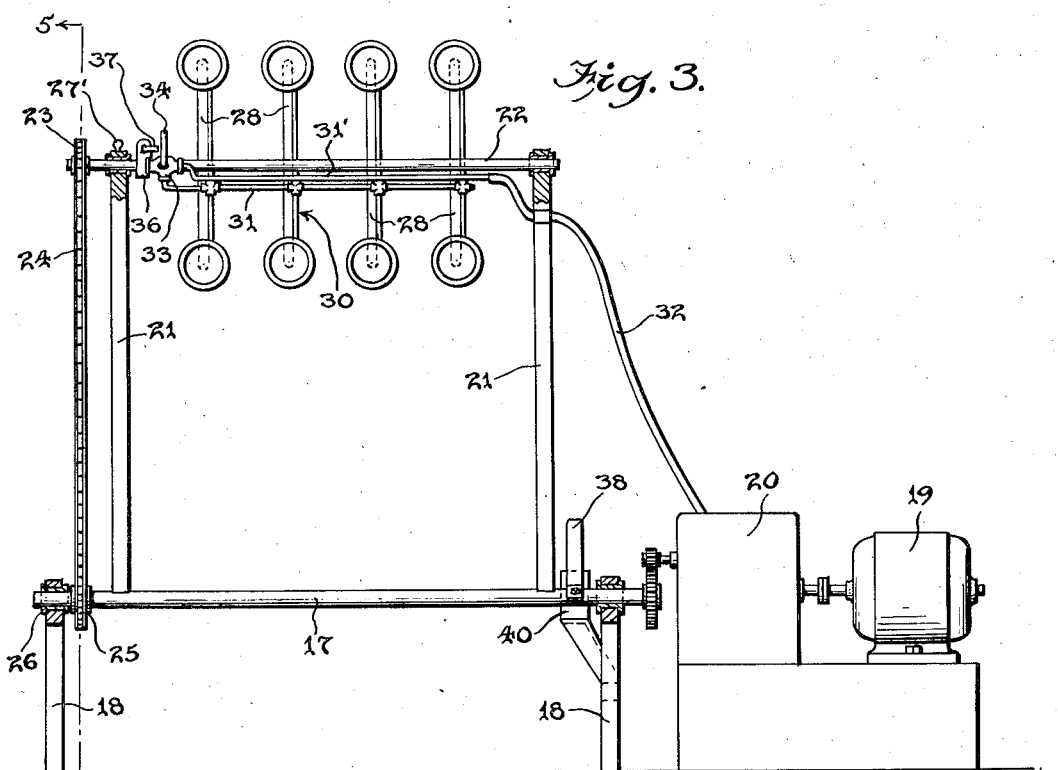
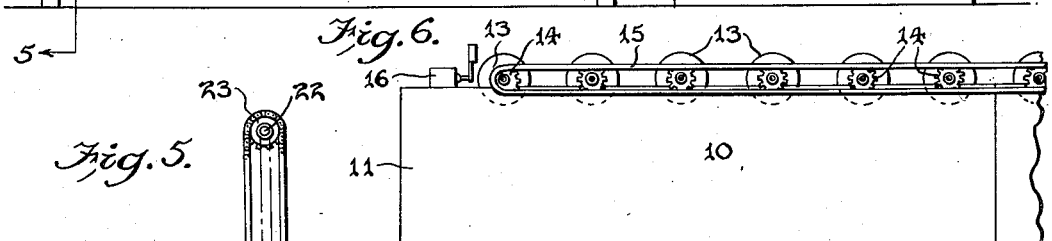
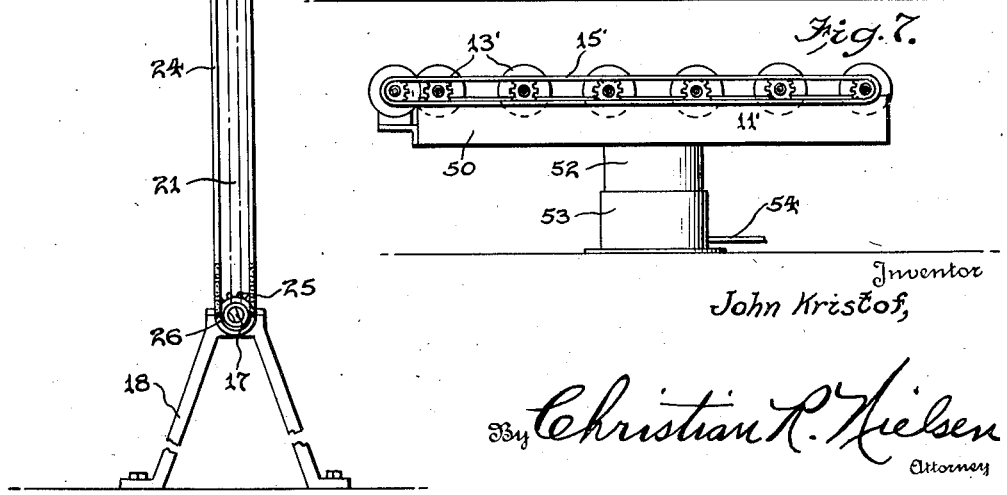

Patented Nov. 26, 1935

2,022,242

UNITED STATES PATENT OFFICE 2,022,242

APPARATUS FOR TURNING PLATE GLASS

John Kristof, New Kensington, Pa.

Application February 11, 1935, Serial No. 6,111

8 Claims. (Cl. 214—1)

In the manufacture of plate glass in large scale production systems, it is necessary to remove or segregate certain sheet units from a main conveyor to temporary supports for special examination or treatment or to conveyors for distribution to particular points of delivery, as for packing, storage, etc.

It is the aim of this invention to present an improved and novel means for the handling of large plates of glass in such operations. It is an important aim to present a device adapted to remove a large plate from a conveyor table to another support spaced therefrom, and at will either invert the plate, or dispose it on the new support in the same position as when lifted from the first. An important purpose is to present a novel construction in automatic apparatus for effecting the removal of glass plates from a conveyor with safety and despatch. It will be understood that plate glass sheets involve great weight, and the use of heavy mechanism which must function promptly and accurately to avoid damage to the product, and it is therefore an important aim of the invention to evolve novel and desirable means for controlling movement of lifting devices for the ends in view.

An important aim of the invention is to present a novel means for enabling the transfer and inversion of a plate or simple translation of the plate without inversion at the will of the operator.

Additional objects, advantages and features of invention reside in the construction, arrangement and combination of parts involved in the embodiment of the invention, as will appear from the following description and accompanying drawings, wherein Figure 1 is a plan of a conveyor table with my turn-over device disposed over a receiving table.

Figure 2 is an end elevation of the conveyor table, the turnover device and receiving table, with the turnover device on the conveyor table.

Figure 3 is an elevation of the turn-over device at right angles to Figure 2.

Figure 4 is a detail of the reversing switch.

Figure 5 is an elevation of the turn-over device from the left of Figure 3.

Figure 6 is a detail of the conveyor table.

Figure 7 is a detail of one form of receiving table.

Figure 8 is an enlarged detail of the mounting of the control sprocket for the turning frame.

Figure 9 shows the wiring diagram for the control devices.

Figure 1:
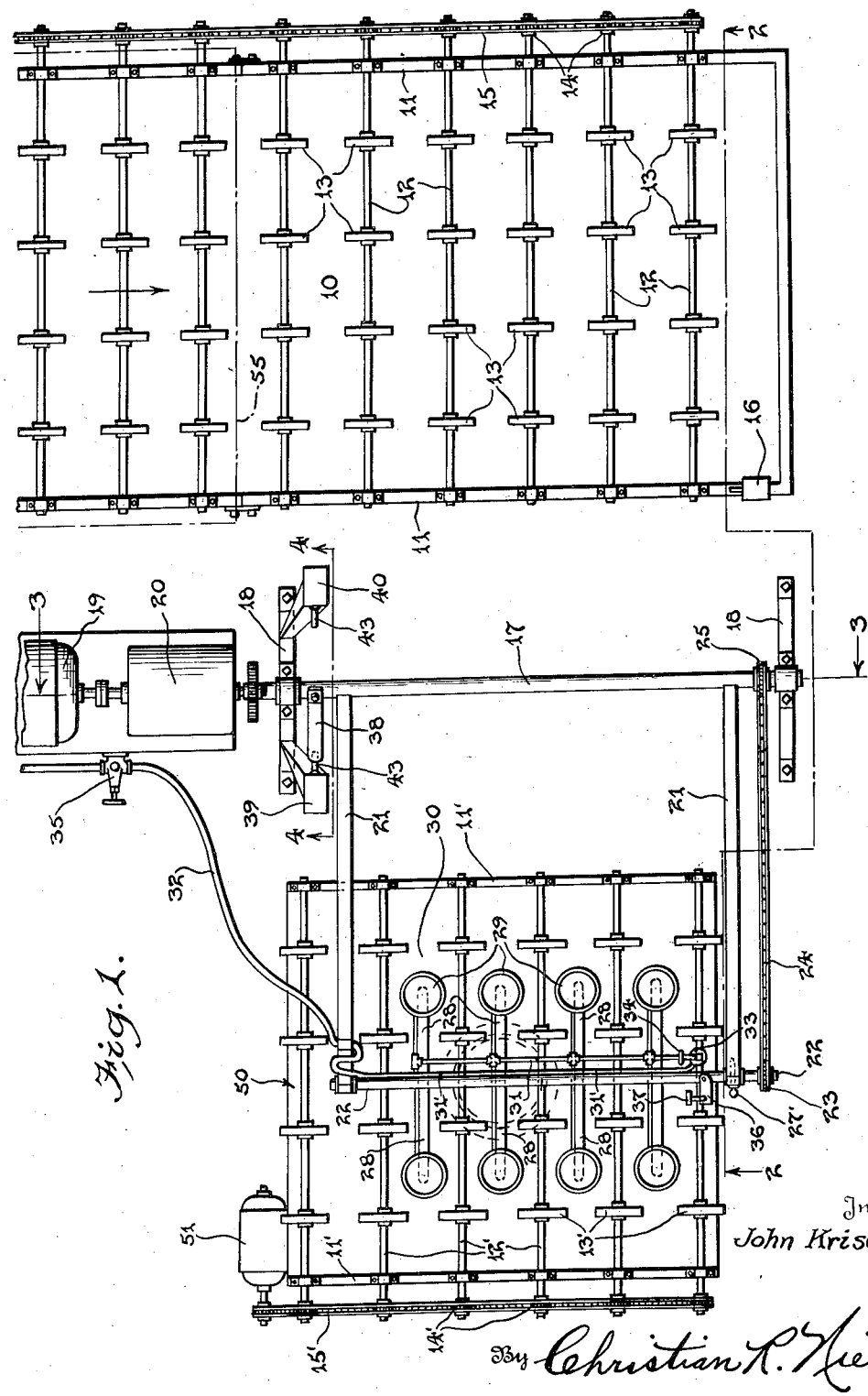

There is illustrated a conveyor table 10, of familiar construction involving a frame 11 supporting a horizontal series of transverse parallel revoluble shafts 12 having glass supporting rolls or wheels 13 thereon, the shafts all having sprockets 14 at one side of the frame 11 driven by a common chain 15, so that all the wheels rotate in the same direction, and are adapted thereby to move a plate in the direction of the arrow in Figure 1. At the end of the frame 11 an emergency switch 16 may be located if desired, to be operated by impingement of a glass plate passing upon the wheels 13 in case such plate is not engaged and removed by my turnover device or otherwise.

Beside the table 10, my turn-over device, so-called, is installed comprising a main horizontal shaft 17 (journalled in floor brackets 18 near or at the plane of the upper sides of the wheels 13), an electric motor 19, and a reduction gear train 20 by which the main shaft is rotated. The shaft 17 carries two parallel radial carrier arms 21 fixed on the shaft 17 near its ends at right angles to the shaft, and at the outer ends of the arms there is revolubly mounted a horizontal rock shaft 22, on one end of which outwardly of one arm 21 a sprocket 23 is fixed, having an endless chain 24 therearound extended to and around a similar sprocket 25 fitted for rotation at times on a sleeve 26 fixed upon the adjacent bracket 18, this sleeve serving as the bearing for the shaft 17 at this end. The sprocket 25 is adapted to be fixed on the sleeve by means of a removable key 27. The shaft 22 may be releasably pinned to the arms 22 as at 27'.

The arc of movement of the shaft 22 on the arms 21 falls on the medial longitudinal line of the conveyor table 10, and fixed in a common plane on and transverse to the shaft 22 there is a plurality of straight bars or arms 28 having a suitable number of vacuum cups 29 thereon, (all presented in one direction), together comprising a lifter frame 30, one cup being shown at each end and in each bar 28 in the present instance. These cups are symmetrically located with respect to the width of the table 10 when the lifting frame is thereadjacent as will be described. On the lifter frame there is a branched air conduit 31 having connection with all the cups and with a flexible hose 32 from a spring-closed valve 33 mounted on the shaft 22 nearest the terminal end of the table 10. The valve includes an operating arm 34 adapted to be engaged and operated to open the valve by a plate when moved to position for lifting by the frame 30. From the valve 33 a hose 31' leads to a suitable exhausting apparatus not shown, with an intermediate control valve 35 located conveniently for manual operation. This valve is preferably a two-way valve with atmospheric vent to release the cups 29 at one position. On the shaft 22 near the valve 33 there is located a double pole double throw reversing switch 36 (see Figure 9) by which forward and reverse circuits to the motor are closed alternately. This switch is a spring actuated switch tending to close the reverse circuit, and has an operating arm 37 interposed in the path of the glass plates moved over or under the frame 30 upon the wheels of the table 10 when the frame 30 is in position to receive glass plate. This arm 37 is preferably so located that the valve 33 will have been opened by the glass plate an instant before the switch 36 is closed. The valve 33 does not include any air admission or atmospheric vent, for releasing the cups, such release being effected solely by the valve 35.

On the shaft 17 and bracket 18 at one side means is provided for automatically stopping the motor after each half turn of the shaft 17, or such degree of movement as required for the function of the apparatus as will be explained. This means consists of a stop arm 38 fixed on the shaft 18 and limit switches 39 and 40 of suitable construction respectively interposed in the forward and reverse circuits, 41 and 42. These switches are spring closed, and have operating arms 43 moved by the arm 38 as the latter reaches respective limits of its movement, as shown in Figure 4, and held depressed until opposite rotation of the shaft 17 occurs. A wiring diagram for the switches is shown in Figure 9. On the opposite side of the turn-over device from the table 10 there is located a receiving table 50, which may be of construction similar to the table 10 or may be a solid support or other construction. In the present instance, in what is known as an "air lift" table, and includes a frame 11' carrying shafts 12' and wheels 13' in an arrangement similar to that on the table 10, and an operating chain 15' and sprockets 14' operated at will or otherwise by a motor 51 on the frame 11'. The frame 11' is supported on a piston element 52 operating in a cylinder 53 with a compressed air or other liquid supply 54 which may be controlled at will in any customary manner, so as to effect raising and lowering of the table 50 as required.

The table 50 may be part of a conveyor of any desired length and direction, as required, or may be used to deliver a received plate when the motor 51 is operated. The table 10 may also include an airlift for that part adjacent the turn-over device similar to that at table 50.

The table 10 has the wheels 13 located so that the shaft 22 may fall medially between two mutually adjacent longitudinal series of wheels at the respective limit of movement of the lifter frame 30 on the arms 21. The bars 28 of the lifter frame are so located and spaced that they may fall in respective spaces between shafts 12, and thereby the lifter frame may be swung to the position at the table 10 shown in Figure 2 at the right, where the frame has been rotated on the shaft to present the cups 29 upwardly below the plane of the top edge of the wheels 13.

In use, the chain 15 being in operation with the plate 55 on the table 10, the motor 19 is operated to swing the arms 21 with the frame 30 to position adjacent the table 10. The valve 35 will be open from the exhaust apparatus to the valve 33 but the latter is closed. If the plate is to be inverted, and deposited on the table 50, before lowering of the lifter frame the pin 27 is removed and the frame 30 rotated so that it will occupy the position indicated at $a$ in Figure 2, after which the shaft 22 may be pinned to the arms 21 at 27' as before mentioned. When the plate 55 moves over the frame 30 to a proper position for lifting its advancing edge will engage the arm 34 of the valve 33 opening this valve and causing the vacuum cups to engage the plate, and at the same time the switch 36 will be closed to the "forward circuit" 41 causing the motor 19 to operate to lift the frame 30 and its engaged plate, swinging them through position $b$ to inverted position indicated at $c$ Figure 2 over the table 50, at which time the plate will be a distance above the wheels 13'. At this time the table 50 is in lowered position, and the arm 38 will engage the stop switch 39 stopping the frame 30 in delivery position. The control of the liquid supply to the cylinder is now manipulated to bring the table 50 into supporting engagement with the plate, after which the valve 35 is closed to the exhaust pump and opened to the atmosphere permitting the cups of the frame 30 to release the plate. The operation of the valve 35 may be utilized to operate a shunt switch 56 to close the reverse circuit 42 past the switch 36.

The motor 19 now operates to return the frame 30 to initial or receiving position adjacent the table 10, in position to receive another plate moved over the table wheels 13. Soon after return movement begins, the arm 37 of switch 36 clearing the last deposited plate 55 permits the switch 36 to close in the reverse circuit 42. The arm 38 also clears lever 43 and permits the switch 39 to close again in the forward circuit 39, so that the latter is ready to be closed by the switch 36 when next engaged by a plate on the table 10. The valve 35 is now operated to connect the exhaust as far as the valve 33, and to open the switch 56. The valve arm 34 having cleared the plate 55 lately deposited, the valve 33 will have automatically closed and is ready to be opened by the next plate 55 engaging the arm 34.

As soon as the return or reverse movement of the frame 30 is completed, the arm 38 will engage the limit switch 40 in the reverse circuit, stopping the lifter frame 30 in receiving position over the table 10. As soon as another plate is positioned over the frame 30 it will actuate the switch 36 to close the forward circuit 41 and lift the plate, the cycle described being repeated.

In case the plate to be carried over from table 10 to table 50 is not to be inverted, the frame is adjusted to the position shown at A, Figure 2, and the key 27 engaged to lock the sprocket 25 to the sleeve 26. The frame in this position does not pass below the wheels 13 but lies above them with the cups inverted, and when a plate moving on table 10 reaches proper position, the opening of the valve 33 by the plate will cause the cups to be drawn into proper engagement with the plate, immediately before the switch 36 is closed and before lifting of the frame 30 begins. For proper operation of the limit switch or circuit breaker 40 in this use an extension screw or strike 57 may be provided adjustable on the arm 38 to insure operation of the switch 40 at the proper time. The position of the arms 21 and frame 30 over the table 50 at the delivery of the plate by the last method (without inversion) will be the same as with the first method when the plate was to be inverted, and so the function of the arm 38 and switch 39, as well as the use of the lifting table control will be the same as before. But the frame 30 with its load held by the cups will be rotated by the chain 24 drawn by the locked sprocket 25, so that the frame and the plate carried thereby are moved past intermediate points in horizontal position as at B, Figure 2.

In the wiring of the system, the switch 36 may be a simple double throw pole changer switch to the blades of which respective leads from the service main are connected, and from the central or neutral outlet contact of the switch a wire 45 is led directly to one brush of the motor, while from the other two outlets respective wires 41—42 are led to the limit switches 39 and 40. The outlets from the switches 39 and 40 are bridged and connected to the other brush of the motor by a single wire 44.

I claim:—

1. A transfer for plates comprising a swinging frame having receiving and delivery positions, said frame having a multiplicity of suction cups thereon, an exhaust conduit connected with the cups, means to swing the frame means to deliver plates to the receiving position of the frame, a valve in said conduit having an operating member projected in the path of plates arriving at said receiving position, and means to control the means to swing the frame including an operating member projected in the path of plates arriving at said receiving position, means to control the means to move the frame including stop devices and an operating member operatively connected with the frame to engage and operate the stop devices at respective limits of movement of the frame.

2. A transfer device comprising a travelling frame, means on the frame to engage objects to be transferred, and means responsive to engagement with such objects to control the engaging means, an electric motor operatively connected with the frame, a pole changer switch on the frame operable by objects engaged for transfer, circuit breaking means included in respective circuits from the polechanger to the motor to open the circuits alternately, and means operatively connected with the frame movable to engage and operate respective circuit breakers at respective limits of movement of the frame.

3. In a transfer device of the character described, a rotatable shaft, radial arms thereon, a shaft revoluble on the outer parts of the arms parallel to the first shaft, a transfer frame on the second shaft, means on the frame to engage articles for transfer, a sprocket fixed on the second shaft, a second sprocket revoluble relative to and concentric with the first shaft, a chain around the two sprockets and means to lock the revoluble sprocket against rotation and to lock the second shaft on said arms alternatively at will.

4. In a transfer device of the character described, a conveyor table for plates, a receiving table for plates spaced laterally therefrom, a transfer device comprising a horizontal revoluble shaft parallel to the path of the conveyor table and between the two tables, a radial support fixed thereon, a swinging revoluble member on the outer parts of the radial support, a transfer frame on said revoluble member having article engaging means adapted to engage and fix an article with respect to the second named revoluble member, a sprocket revolubly mounted concentric with the first shaft, and a second sprocket fixed on the axis of the second revoluble part, an endless chain around the sprockets, means to fix the first named sprocket against rotation at times and means to fix the second revoluble member to the radial support at other times.

5. A transfer device of the character described comprising a horizontal revolubly mounted shaft, a reversible electric motor operatively connected therewith, a radial support on the shaft, a lifter frame revoluble on the outer part of the radial support, and having receiving and delivery positions at respective limits of movement of the radial support, article engaging means on the lifter frame, means to move article into receiving position, means on the lifter frame positioned to be engaged by articles moved to receiving position to close forward and reverse circuits to the motor, including means on the lifter frame tending to close the reverse circuit, and positioned to be engaged by articles moved to receiving position and movable thereby to close the forward circuit and open the reverse circuit, stop switch devices included in the forward and reverse circuits respectively, normally tending to remain yieldingly closed, and means connected with the lifter frame to engage the stop devices at respective limits of movement.

6. The structure of claim 5 in which the article engaging means includes suction cups, an exhaust conduit connection therewith a valve in the conduit located on the lifter frame adjacent the receiving position of articles, and having an operating arm in advance of said switch means on the lifter frame to engage articles positioned for transfer and open said valve.

7. The structure of claim 5 in which the article engaging means includes suction cups, an exhaust conduit connection therewith, a valve in the conduit located on the lifter frame adjacent the receiving position of articles, and having an operating arm in advance of said switch means on the lifter frame to engage articles positioned for transfer and open said valve, and an auxiliary switch to close said reverse circuit when the said lifter frame is at delivery position.

8. The structure of claim 5 in which the article engaging means includes suction cups, an exhaust conduit connection therewith, a valve in the conduit located on the lifter frame adjacent the receiving position of articles, and having an operating arm in advance of said switch means on the lifter frame to engage articles positioned for transfer and open said valve, an auxiliary switch to close said reverse circuit when the said lifter frame is at delivery position, and an auxiliary valve operatively connected with the last named switch to close said exhaust conduit to the lifter frame, and open the vacuum cups to the atmosphere and to close said auxiliary switch on movement in one direction, and to open the auxiliary switch and close the atmospheric communication and open the exhaust duct to the valve on the lifter frame on movement in an opposite direction.

JOHN KRISTOF.